United States Patent
Agrawal et al.

(10) Patent No.: US 10,224,809 B1
(45) Date of Patent: Mar. 5, 2019

(54) TOTEM POLE PFC CONVERTER AND SYSTEM

(71) Applicant: Cree, Inc., Durham, NC (US)

(72) Inventors: Binod Kumar Agrawal, Gurgaon (IN); Venkata Subash Bathula, Andhra Pradesh (IN); Navneet Kumar Mangal, Rajasthan (IN); Guy Moxey, Boxford, MA (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 15/725,324

(22) Filed: Oct. 5, 2017

(51) Int. Cl.
  *H02M 1/42* (2007.01)
  *H02M 7/219* (2006.01)
  *H02M 1/00* (2006.01)

(52) U.S. Cl.
  CPC .. *H02M 1/4208* (2013.01); *H02M 2001/0009* (2013.01)

(58) Field of Classification Search
  CPC ............. H02M 1/4208; H02M 1/4225; H02M 1/4233; H02M 1/42; H02M 7/219; Y02B 70/12; Y02B 70/126
  See application file for complete search history.

(56) References Cited

U.S. PATENT DOCUMENTS

| | | | | |
|---|---|---|---|---|
| 6,249,108 B1 * | 6/2001 | Smedley | ............... | H02J 3/1842 323/207 |
| 8,937,821 B2 * | 1/2015 | Amano | .................. | H02M 7/219 363/125 |

OTHER PUBLICATIONS

Energy Star, "Energy Star Specification 5.0 for Computers," Available online at: https://www.energystar.gov/ia/partners/prod_development/revisions/downloads/computer/Version5.0_Computer_Spec.pdf, Nov. 14, 2008, pp. 1-27.

Huber, L., et al., "Performance Evaluation of Bridgeless PFC Boost Rectifiers," IEEE Transactions on Power Electronics, vol. 23, No. 3, May 2, 2008, pp. 165-171.

Ye, Z., et al., "GaN FET-Based CCM Totem-Pole Bridgeless PFC," 2014 Texas Instruments Power Supply Design Seminar SEM2100, Topic 6, TI Literature No. SLUP327, 2014, pp. 6-1-6-11.

Zhou, L., et al., "99% Efficiency True-Bridgeless Totem-Pole PFC Based on GaN HEMTs," Available online at: http://www.transphormusa.com/sites/default/files/transphorm/news/Totem-pole%20paper_0.pdf, 2013, 9 pages.

(Continued)

*Primary Examiner* — Gary L Laxton
(74) *Attorney, Agent, or Firm* — Anthony J. Josephson

(57) ABSTRACT

A totem pole power factor correction (PFC) converter is disclosed. The totem pole PFC converter includes a first transistor having a first current terminal coupled to a first node, a first control terminal, and a second current terminal. Also included is a second transistor having a third current terminal coupled to the second current terminal at a second node, a second control terminal, and a fourth current terminal coupled to a third node. A first rectifier is coupled to the first node and a first current sense resistor is coupled between the first rectifier and a fourth node. A second rectifier is coupled to the third node and a second current sense resistor coupled between the second rectifier and the fourth node. A current sense voltage for an analog controller is generated by current alternately flowing through the first current sense resistor and the second current sense resistor.

22 Claims, 6 Drawing Sheets

(56) References Cited

OTHER PUBLICATIONS

Zhou, L., et al., "High-efficiency True Bridgeless Totem Pole PFC based on GaN HEMT: Design Challenges and Cost-effective Solution," Proceedings of PCIM Europe 2015: International Exhibition and Conference for Power Electronics, Intelligent Motion, Renewable Energy and Energy Management, Nuremberg, Germany, May 19-21, 2015, pp. 1482-1489.

Zhu, M., "1.5 kW Totem-pole PFC Using 650V USCi SiC Cascodes," Application Note USCi_AN0012, United Silicon Carbide, Dec. 2016, pp. 1-4.

* cited by examiner

TOTEM POLE PFC CONVERTER AND SYSTEM

FIELD OF THE DISCLOSURE

The present disclosure relates to high-efficiency power supply technology. In particular, the present disclosure is directed to a totem pole power factor correction (PFC) converter that is configured to be controlled by an analog controller.

BACKGROUND

Power converter circuits may be used to convey power from a source, such as a battery, power supply, or electrical power grid, to a load, such as any device, apparatus, or component that runs on electricity, preferably with as little loss as possible. Generally, a power converter circuit provides an output voltage that has a different voltage than the input voltage. It is generally desirable to control power converters and systems with controllers having limited complexity and expense while achieving high efficiency. For example, a power converter and system having an analog controller may be less complex and less expensive than a power converter and system with a digital controller.

SUMMARY

A totem pole power factor correction (PFC) converter is disclosed. The totem pole PFC converter includes a first transistor having a first current terminal coupled to a first node, a first control terminal, and a second current terminal. Also included is a second transistor having a third current terminal coupled to the second current terminal at a second node, a second control terminal, and a fourth current terminal coupled to a third node. A first rectifier is coupled to the first node and a first current sense resistor is coupled between the first rectifier and a fourth node. A second rectifier is coupled to the third node and a second current sense resistor coupled between the second rectifier and the fourth node. A current sense voltage for an analog controller is generated by current alternately flowing through the first current sense resistor and the second current sense resistor. The analog controller controls switching of the first transistor and the second transistor in response to the current sense voltage.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

DETAILED DESCRIPTION

Figure 1:
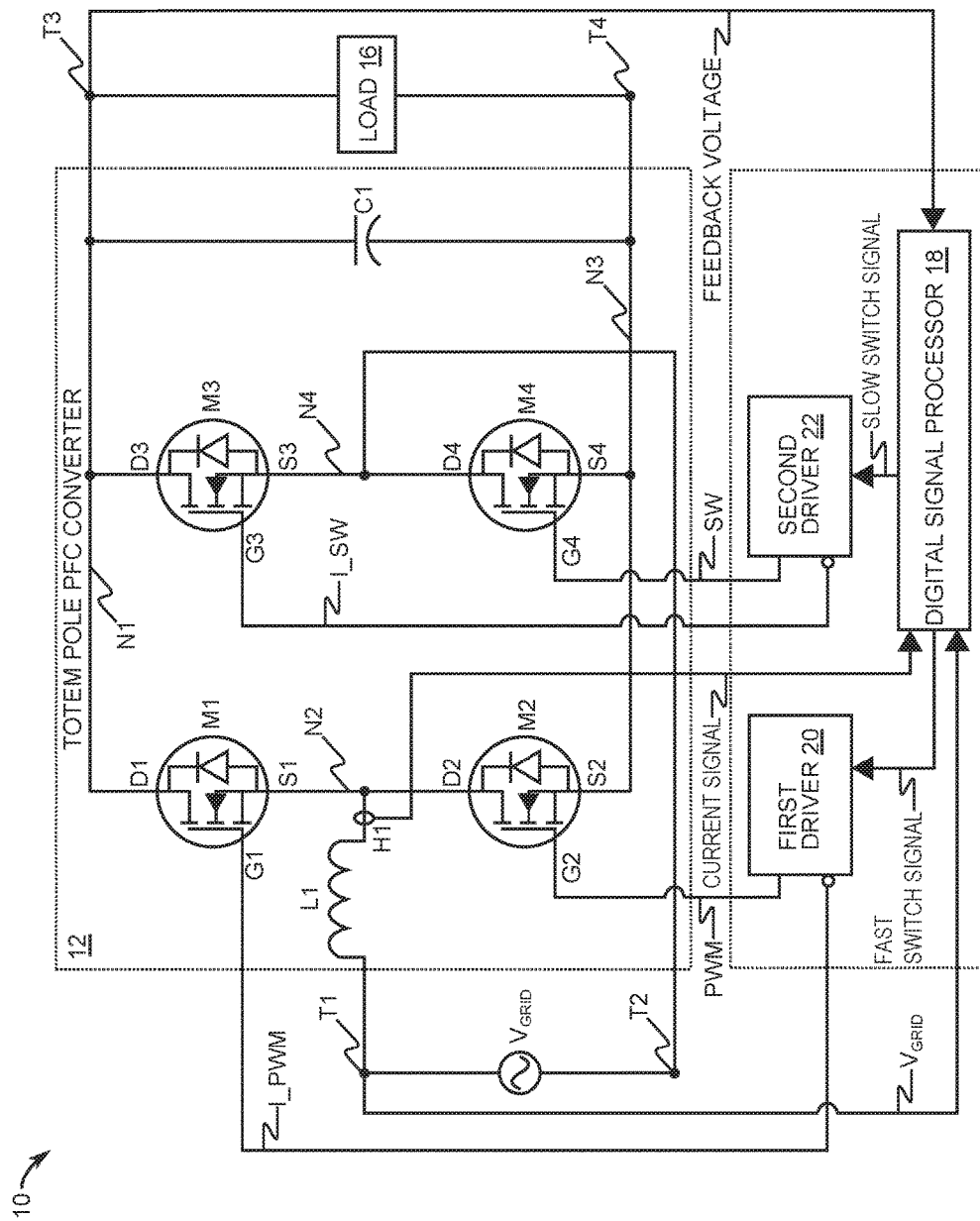
FIG. 1 is a schematic of a related-art power factor correction (PFC) converter system that is based upon a totem pole PFC converter.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Traditionally, totem pole power factor correction (PFC) converters are controlled by digital controllers that include digital signal processors. Compared with analog-type controllers that are used to control other types of PFC converters, the digital controllers used to control totem pole PFC converters are more costly and more complex. Thus, there is a need for a totem pole PFC converter that is configured to be controlled by an analog controller.

FIG. 1 is a schematic of a related-art PFC converter system 10 that is based upon a related-art totem pole PFC converter 12 that is controlled by a digital controller 14. The related-art totem pole PFC converter 12 includes a first transistor M1 having a drain D1 coupled to a first node N1, a gate G1, and a source S1. A second transistor M2 has a second drain D2 coupled to the source of the first transistor M1 at a second node N2, a gate G2, and a source S2 coupled to a third node N3.

The related-art totem pole PFC converter 12 further includes a third transistor M3 that has a third drain D3 coupled to the first node N1 and a third source S3 coupled to a fourth node N4, and a third gate G3. A fourth transistor M4 has a fourth drain D4 coupled to the source S3 at the fourth node N4, a fourth source S4 coupled to the third node N3, and a fourth gate G4.

The related-art totem pole PFC converter 12 also includes a first grid terminal T1 and a second grid terminal T2 that is coupled to the fourth node N4. A PFC inductor L1 is coupled between the first grid terminal T1 and the second node N2. A Hall effect current sensor H1 is coupled between the filter inductor L1 and the second node N2. The Hall effect current sensor H1 provides current feedback to the digital controller 14. An external load 16 is coupled between the first node N1 at a third terminal T3 and the second node N2 at a fourth terminal T4. A filter capacitor C1 is coupled between the first node N1 and the third node N3 in parallel with the external load 16.

The digital controller 14 includes a digital signal processor (DSP) 18 that receives a feedback voltage from the first node N1. The feedback voltage is scaled to an appropriate level for input to the DSP 18 by attenuation analog-to-digital conversion circuitry (not shown). Scaling of the feedback voltage is necessary due to a relatively high direct current (DC) voltage level of 400 V. The DSP 18 further receives a current signal from the Hall effect current sensor H1 and a grid voltage signal that is derived from the grid voltage $V_{GRID}$ and is scaled appropriately for the DSP 18 by attenuation and analog-to-digital conversion circuitry (not shown). Attenuation is necessary because the grid voltage $V_{GRID}$ is typically from 120 $V_{RMS}$ to 265 $V_{RMS}$.

The digital controller 14 further includes a first driver 20 that receives a fast switch signal from the DSP 18 and in response outputs a pulse width modulation (PWM) signal and an inverted pulse width modulation (I_PWM) signal. The I_PWM signal drives the first gate G1 of the first transistor M1, and the PWM signal drives the second gate G2 of the second transistor M2. A switching frequency of the I_PWM and PWM signals is between 20 kHz and 400 kHz.

The digital controller 14 also includes a second driver 22 that receives a slow switching signal from the DSP 18 and in response outputs a square wave SW signal and an inverted square wave I_SW signal. The SW signal and the I_SW signal both have a fixed frequency that is equal to the frequency of the grid voltage $V_{GRID}$. In the United States the grid voltage frequency is 60 Hz.

While the related-art PFC converter system 10 may work well in some applications, it has some distinct disadvantages. One disadvantage is that the digital controller 14 is relatively expensive compared with analog-type controllers. At least one other disadvantage is that the Hall effect current sensor H1 provides a relatively sluggish current sense signal and thus may not allow the digital controller 14 to react with enough responsiveness for some applications.

Figure 2:
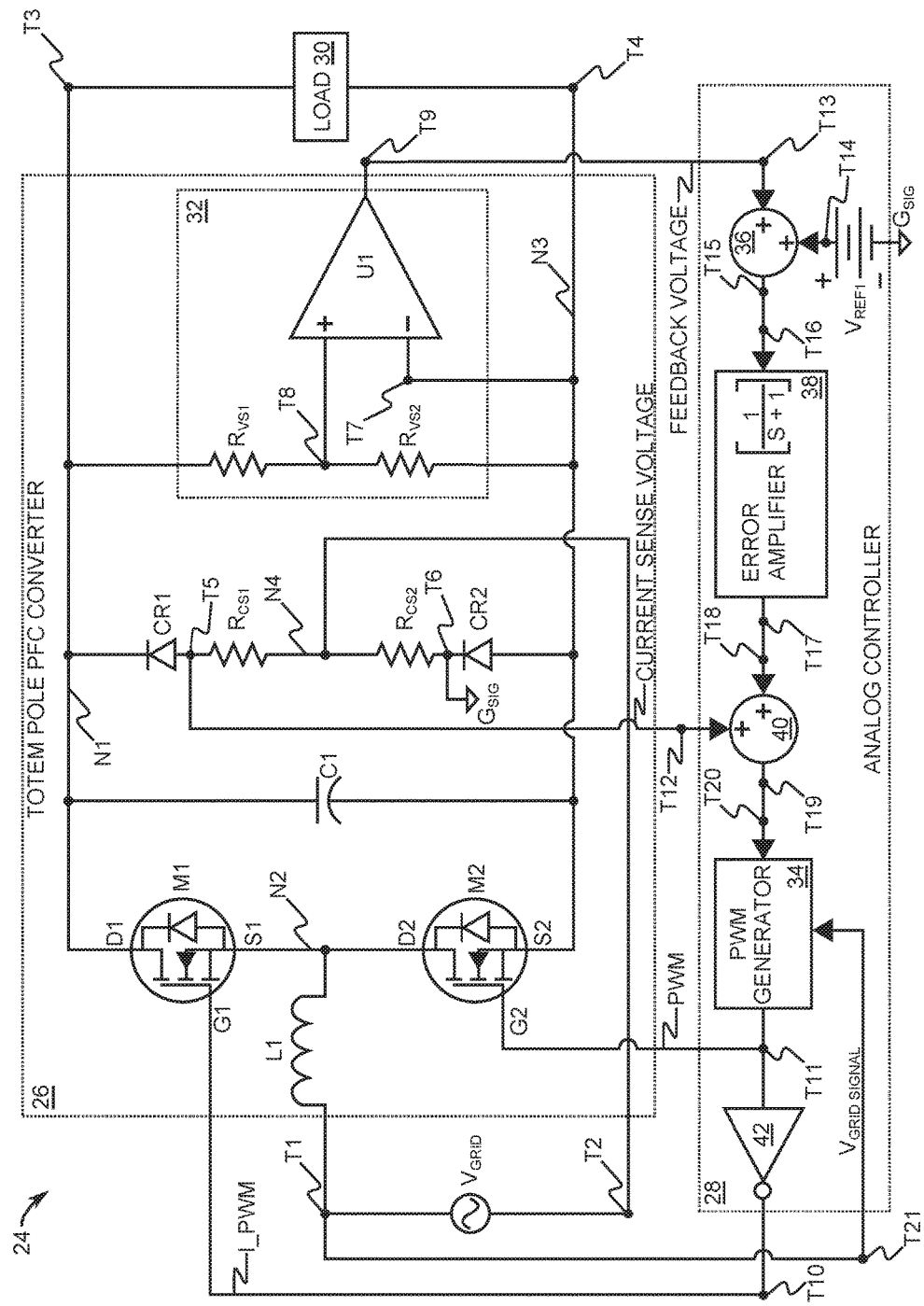
FIG. 2 is a schematic of a PFC converter system including a totem pole PFC converter that is configured in accordance with the present disclosure to overcome limitations of the related-art PFC converter system of FIG. 1.

FIG. 2 is a schematic of a power factor correction (PFC) converter system 24 including a totem pole PFC converter 26 that is configured in accordance with the present disclosure to overcome the limitations of the related-art PFC converter system 10. The totem pole PFC converter 26 is configured in accordance with the present disclosure to be controlled by analog controllers, such as analog controller 28 depicted generally in FIGS. 2-6.

The totem pole PFC converter 26 includes a first grid terminal T1 and a second grid terminal T2. A 60 Hz sinusoidal grid voltage $V_{GRID}$ that is typically from 120 $V_{RMS}$ to 265 $V_{RMS}$ is applied across the first grid terminal T1 and the second grid terminal T2. The totem pole PFC converter 26 also includes a first transistor M1 having a first current terminal D1 coupled to a first node N1, a first control terminal G1 and a second current terminal S1. A second transistor M2 has a third current terminal D2 coupled to the second current terminal S1 at a second node N2, a second control terminal G2, and a fourth current terminal S2 coupled to a third node N3. In at least some embodiments, the first transistor M1 and the second transistor M2 are field-effect transistors (FETs) and in particular gallium nitride (GaN) metal oxide semiconductor field-effect transistors (MOSFETs).

A first rectifier CR1 is coupled to the first node N1, and a first current sense resistor $R_{CS1}$ is coupled between the first rectifier and a fourth node N4 that is coupled to the second grid terminal T2. A second rectifier CR2 is coupled to the third node, and a second current sense resistor $R_{CS2}$ is coupled between the second rectifier CR2 and the fourth node N4. In some embodiments, a resistance range for the first current sense resistor $R_{CS1}$ and second current sense resistor $R_{CS2}$ is from 1 milliohm (mΩ) to 8 mΩ for kilowatt loads. For example, an 8 mΩ resistance for the first current sense resistor $R_{CS1}$ and second current sense resistor $R_{CS2}$ is practical for a 2 kW load. In other embodiments, a 100 mΩ resistance for the first current sense resistor $R_{CS1}$ and second current sense resistor $R_{CS2}$ is appropriate for lower power loads on the order of 100 W. The first current sense resistor $R_{CS1}$ and second current sense resistor $R_{CS2}$ typically have a resistivity precision of 1% to avoid control errors. In at least one embodiment, the resistor technology is thin film, but other resistor technologies are practical as long as inductance is negligible.

An external load 30 is coupled between the first node N1 at a third terminal T3 and the second node N3 at a fourth terminal T4. A PFC inductor L1 is coupled between the first grid terminal T1 and the second node N2, and a filter capacitor C1 is coupled between the first node N1 and the third node N3 in parallel with the external load 30.

The totem pole PFC converter 26 further includes a current sense signal terminal T5 coupled between the first rectifier CR1 and the first current sense resistor $R_{CS1}$. A current sense ground terminal T6 is coupled between the second current sense resistor $R_{CS2}$ and the second rectifier CR2. In some embodiments, the first rectifier CR1 and the second rectifier CR2 are rectifier diodes. In other embodiments, transistors such as the third transistor M3 and the fourth transistor M4 depicted in FIG. 1 may be substituted for the first rectifier CR1 and the second rectifier CR2. However, substituting transistors for the first rectifier CR1 and the second rectifier CR2 adds a complexity of additional driver circuitry needed to alternately drive a substituted third transistor M3 and a substituted fourth transistor M4 at grid frequency. In most applications, the complexity and expense of additional driver circuitry needed to alternately drive a substituted third transistor M3 and a substituted fourth transistor M4 may not be justified because the totem pole PFC converter 26 using diodes for the first rectifier CR1 and the second rectifier CR2 achieves between 98% and 99% efficiency under a 2000 W load coupled between the first load terminal T3 and the second load terminal T4.

The current sense ground terminal T6 is coupled to a signal ground $G_{SIG}$ that is shared by the analog controller 28. During operation, a current sense voltage is provided between the current sense signal terminal T5 and the current sense ground terminal T6. The current sense voltage is a negative voltage by current alternately flowing through the first current sense resistor $R_{CS1}$ and the second current sense resistor $R_{CS2}$.

In at least one embodiment, the totem pole PFC converter 26 further includes a feedback voltage generator 32 that provides a feedback voltage for the analog controller 28. The feedback voltage generator 32 includes an amplifier U1 having a first amplifier input terminal T7 coupled to the third node N3, a second amplifier input terminal T8, and a sense voltage output terminal T9. A first voltage sense resistor $R_{VS1}$ is coupled between the first node N1 and the second amplifier input terminal T8, and a second voltage sense resistor $R_{VS2}$ is coupled between the second amplifier input terminal T8 and the third node N3.

In an exemplary embodiment, the analog controller 28 includes a first control output terminal T10 coupled to the first control terminal G1, and a second control output terminal T11 coupled to the second control terminal G2. A current sense input terminal T12 coupled to the current sense output terminal T5. The signal ground $G_{SIG}$ for the analog controller 28 is coupled to the current sense output terminal T6. A pulse width modulator (PMW) generator 34 is configured to provide a first switching signal I_PWM through the first control output terminal G1 and provide a second switching signal PWM through the second control output terminal G2 in response to the current sense voltage generated between the current sense output terminal T5 and the current sense ground terminal T6.

The analog controller 28 further includes a first summing node 36 having a first summing input T13 coupled to the sense voltage output terminal T9, a second summing input terminal T14 coupled to a reference voltage $V_{REF1}$, and a first summing output terminal T15 for providing an error voltage that is a summation of the feedback voltage generated by the feedback voltage generator 32 and the reference voltage $V_{REF1}$. The analog controller 28 also includes an error amplifier 38 having an error voltage input terminal T16 coupled to the first summing output terminal T15 and an amplified error voltage output terminal T17 for providing an amplified error voltage. A second summing node 40 having a third summing input terminal T18 is coupled to the amplified error voltage output terminal T17 to receive the amplified error voltage, and a fourth summing input terminal that is the current sense input terminal T12 receives the current sense voltage, and a second summing output terminal T19 is coupled to a first PWM input terminal T20 of the PWM generator 34, which is configured to receive a resultant voltage provided at the second summing output terminal T19 of the second summing node 40.

In an exemplary embodiment, the PWM generator 34 provides the PWM signal to the second control terminal G2 through the second control output terminal T11. The PWM signal is inverted by an inverter gate 42 that provides the I_PWM signal to the first control terminal G1 through the first control output terminal T10. A copy of the grid voltage captured as a grid voltage signal $V_{GRID}$ SIGNAL from the first grid terminal T1 is coupled to a second PWM input T21. The PWM generator 34 uses the grid voltage signal $V_{GRID}$ $_{SIGNAL}$ to route PWM pulses of the first switching signal I_PWM and the second switching signal PWM to an appropriate one of the first transistor M1 and the second transistor M2 during the positive half cycle of $V_{GRID}$ and the negative half cycle of $V_{GRID}$. FIGS. 3-6 depict the appropriate routing of the PWM pulses for a complete $V_{GRID}$ cycle.

Figure 3:
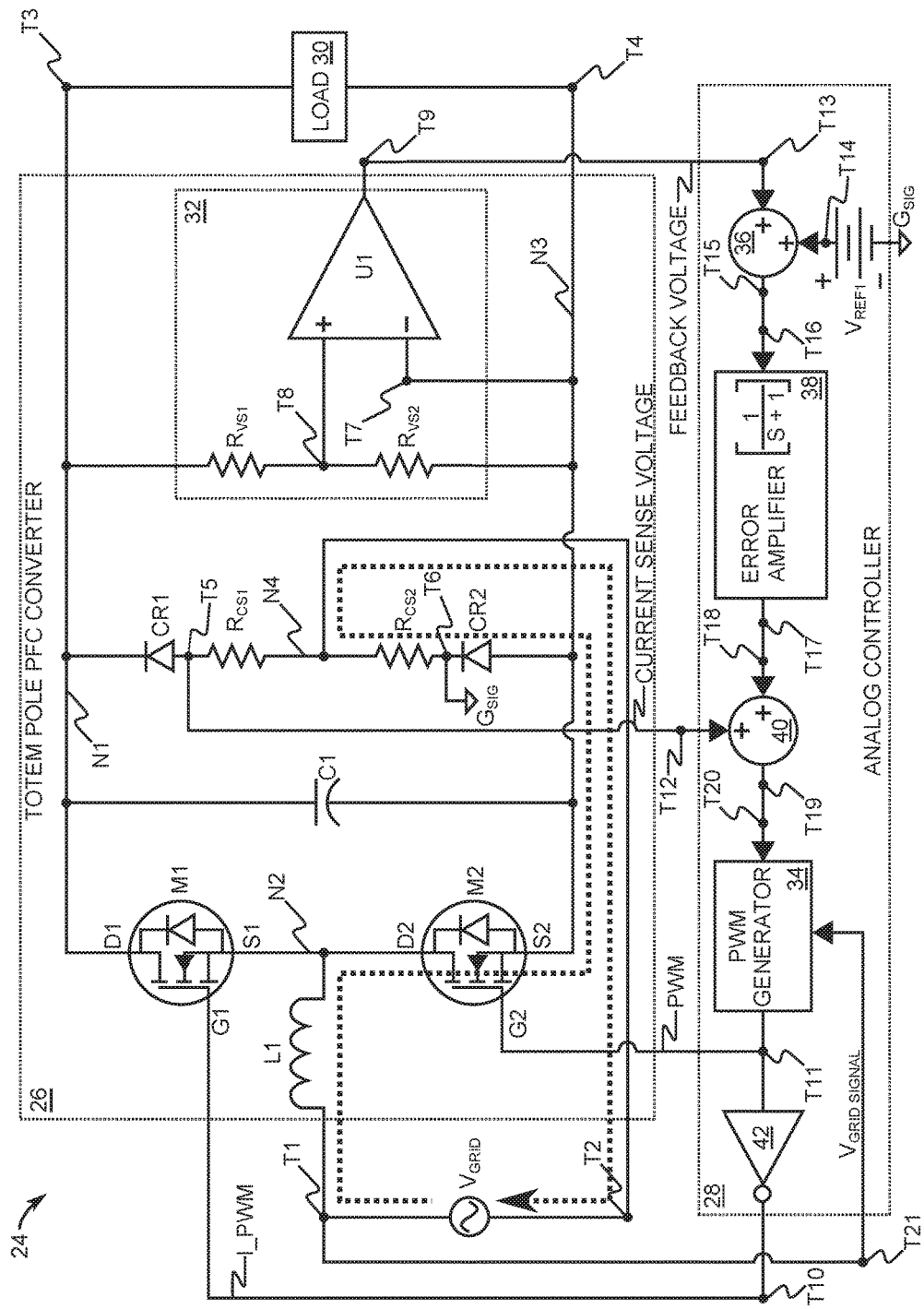
FIG. 3 depicts continuous conduction mode (CCM) operation of the totem pole PFC converter during a positive half cycle of a 60 Hz sinusoidal grid voltage in which current switched in a kilohertz frequency range is routed through one of two current sense resistors by way of a first current path.

FIG. 3 depicts continuous conduction mode (CCM) operation of the totem pole PFC converter 26 during a positive half cycle of the 60 Hz sinusoidal grid voltage $V_{GRID}$ in which current switched in a kilohertz frequency range is routed through the second current sense resistor $R_{CS2}$ by way of a first current path. The route of the current is depicted in dashed line with an arrow head indicating the direction of current flow. In this case, the first transistor M1 is switched off and non-conducting while the second transistor M2 is switched on and conducting to provide a current path through the second rectifier CR2 and the second current sense resistor $R_{CS2}$. No current flows through the first current sense resistor $R_{CS1}$ and the first rectifier CR1 at this time. Therefore with this first current path, a voltage drop across the second current resistor $R_{CS2}$ is the current sense voltage developed between the current sense signal terminal T5 and the current sense ground terminal T6.

Figure 4:
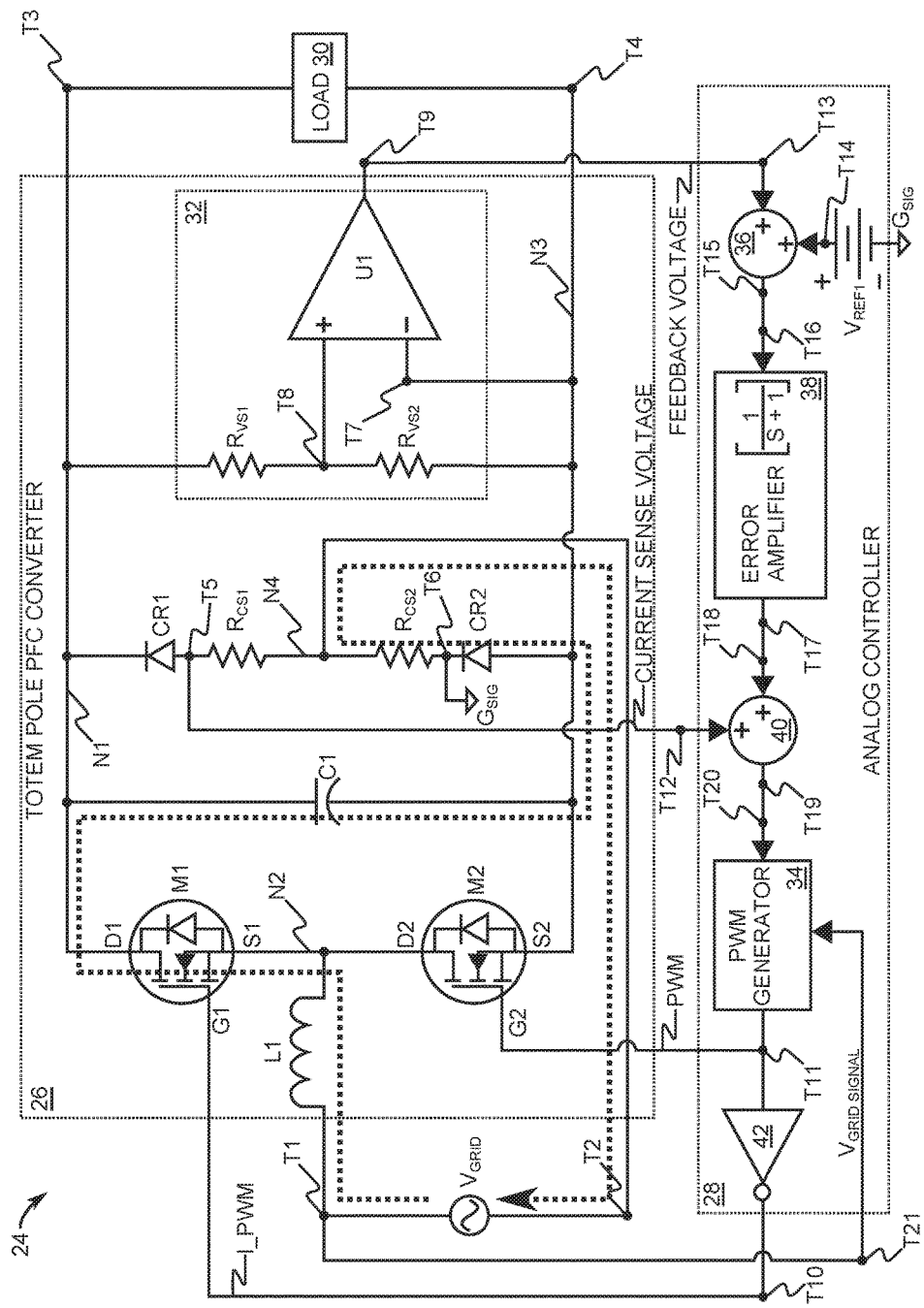
FIG. 4 depicts CCM operation of the totem pole PFC converter during the positive half cycle of the 60 Hz sinusoidal grid voltage in which current switched in the kilohertz frequency range is routed through one of the two current sense resistors by way of a second current path.

FIG. 4 depicts CCM operation of the totem pole PFC converter 26 during the positive half cycle of the 60 Hz sinusoidal grid voltage $V_{GRID}$ in which current switched in the kilohertz frequency range is routed through the second current sense resistor $R_{CS2}$ by way of a second path. In this case, the first transistor M1 is switched on and conducting while the second transistor M2 is switched off and non-conducting to provide the second current path through the filter capacitor C1, the second rectifier CR2 and the second current sense resistor $R_{CS2}$. As such, no current flows through the first current sense resistor $R_{CS1}$ and the first rectifier CR1. Therefore with this second current path, the voltage drop across the second current resistor $R_{CS2}$ remains the current sense voltage developed between the current sense signal terminal T5 and the current sense ground terminal T6.

Figure 5:
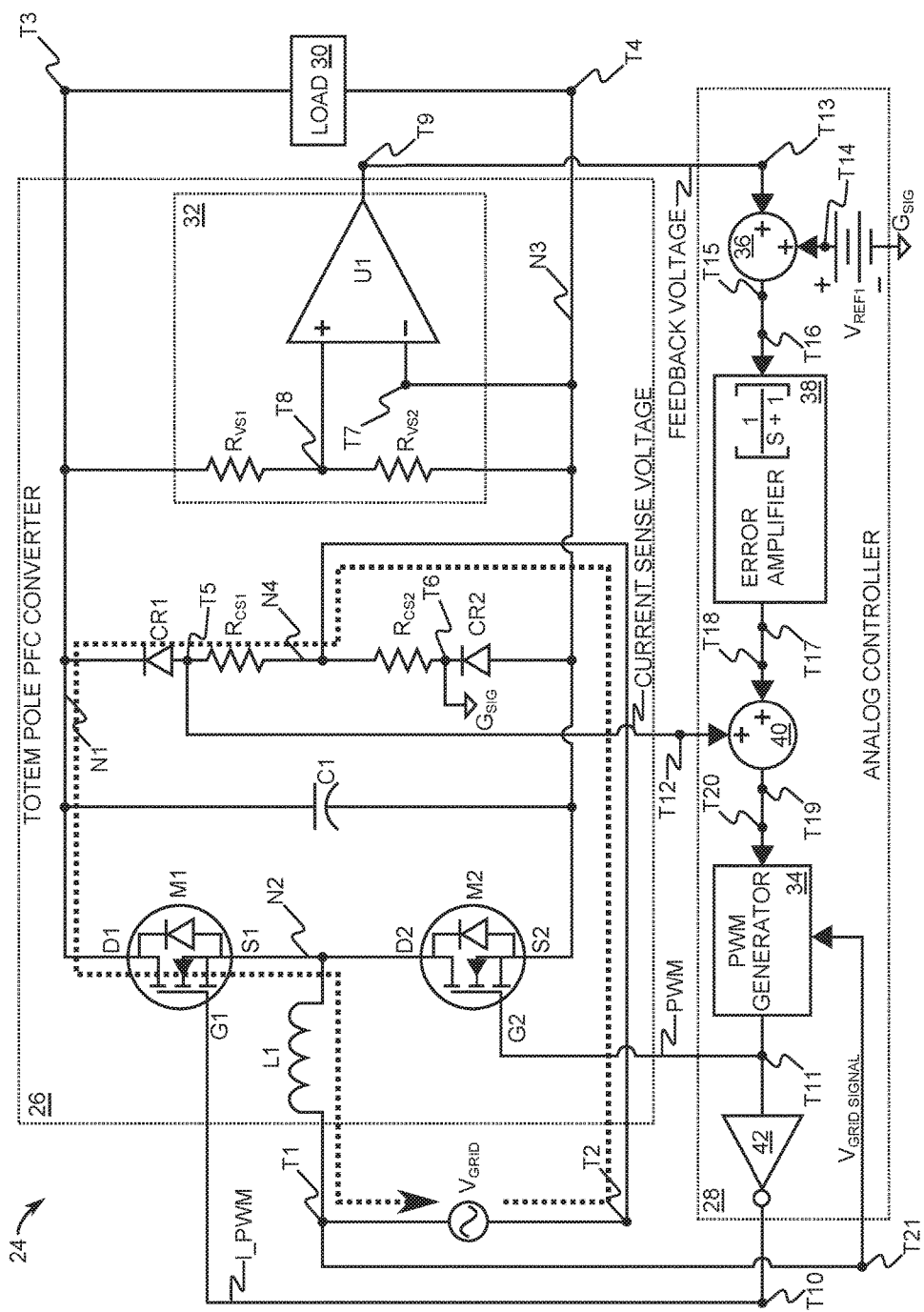
FIG. 5 depicts CCM operation of the totem pole PFC converter during a negative half cycle of the 60 Hz sinusoidal grid voltage in which current switched in the kilohertz frequency range is routed through another one of the two current sense resistors by way of a third current path.

FIG. 5 depicts CCM operation of the totem pole PFC converter 26 during a negative half cycle of the 60 Hz sinusoidal grid voltage $V_{GRID}$ in which current switched in the kilohertz frequency range is routed through the first current sense resistor $R_{CS1}$ by way of a third path. In this case, the first transistor M1 is switched on and conducting while the second transistor M2 is switched off and non-conducting to provide the third current path through the first current sense resistor $R_{CS1}$ and the first rectifier CR1. At this point, no current flows through the second rectifier CR2 and the second current sense resistor $R_{CS2}$. Therefore with this third current path, the voltage drop across the first current resistor $R_{CS1}$ is the current sense voltage developed between the current sense signal terminal T5 and the current sense ground terminal T6.

Figure 6:
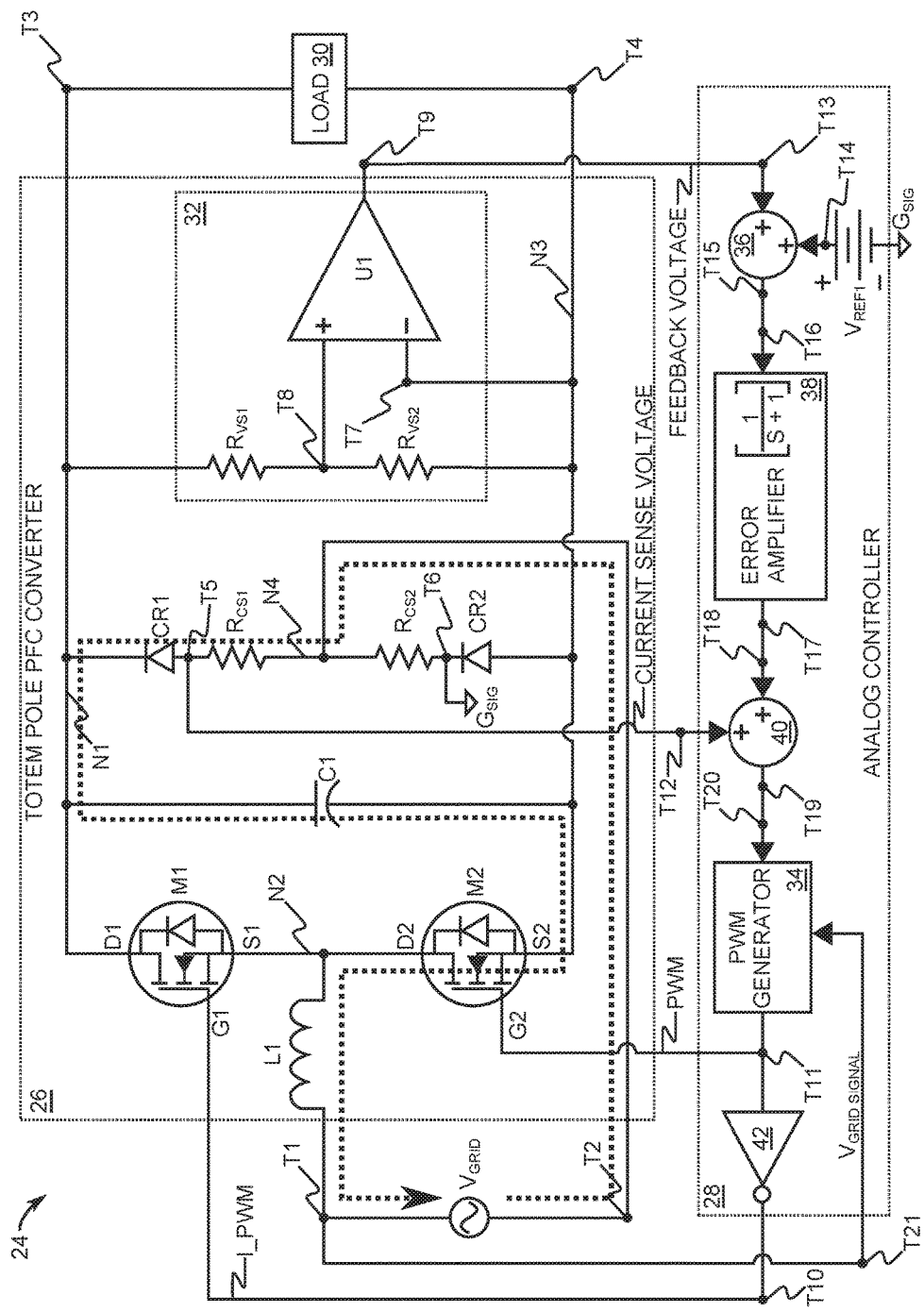
FIG. 6 depicts CCM operation of the totem pole PFC converter during the negative half cycle of the 60 Hz sinusoidal grid voltage in which current switched in the kilohertz frequency range is routed through the another one of the two current sense resistors by way of a fourth current path.

FIG. 6 depicts CCM operation of the totem pole PFC converter 26 during a negative half cycle of the 60 Hz sinusoidal grid voltage $V_{GRID}$ in which current switched in the kilohertz frequency range is again routed through the first current sense resistor $R_{CS1}$ by way of a fourth path. In this case, the first transistor M1 is switched off and is non-conducting while the second transistor M2 is switched on and conducting to provide the fourth current path the first current sense resistor $R_{CS1}$ and the first rectifier CR1. At this point, no current flows through the second rectifier CR2 and the second current sense resistor $R_{CS2}$. Therefore with this fourth current path, the voltage drop across the first current resistor $R_{CS1}$ is the current sense voltage developed between the current sense signal terminal T5 and the current sense ground terminal T6.

A benefit of the PFC converter system 24 is that a bill of materials cost to implement the PFC converter system 24 with an analog controller such as analog controller 28 is relatively much lower than the PFC converter system 10 using the digital controller 14 (FIG. 1). The cost savings is realized due to the inclusion of the first current sense resistor $R_{CS1}$ and the second current sense resistor $R_{CS2}$ such that the totem pole PFC converter 26 is configured to be controlled by the analog controller 28. Another benefit is that firmware does not need to be developed for a digital controller, thereby further reducing production costs. Other benefits of the PFC converter system 24 of the present disclosure will be recognized by those skilled in the art.

Those skilled in the art will recognize improvements and modifications to the preferred embodiments of the present disclosure. All such improvements and modifications are considered within the scope of the concepts disclosed herein and the claims that follow.

What is claimed is:

1. A totem pole power factor correction (PFC) converter comprising:
    a first transistor having a first current terminal coupled to a first node, a first control terminal, and a second current terminal;
    a second transistor having a third current terminal coupled to the second current terminal at a second node, a second control terminal, and a fourth current terminal coupled to a third node;
    a first rectifier coupled to the first node;
    a first current sense resistor coupled between the first rectifier and a fourth node;
    a second rectifier coupled to the third node; and
    a second current sense resistor coupled between the second rectifier and the fourth node.

2. The totem pole PFC converter of claim 1 further comprising a current sense signal terminal coupled between the first rectifier and the first current sense resistor and a current sense ground terminal coupled between the second current sense resistor and the second rectifier.

3. The totem pole PFC converter of claim 2 wherein during operation a current sense voltage between the current sense signal terminal and the current sense ground terminal is a negative voltage generated by current alternately flowing through the first current sense resistor and the second current sense resistor.

4. The totem pole PFC converter of claim 1 further including a feedback voltage generator comprising:
    an amplifier having a first amplifier input terminal coupled to the third node, a second amplifier input terminal, and a sense voltage output terminal;
    a first voltage sense resistor coupled between the first node and the second amplifier input terminal; and
    a second voltage sense resistor coupled between the second amplifier input terminal and the third node.

5. The totem pole PFC converter of claim 1 further comprising:
    a first grid voltage terminal;
    a filter inductor coupled between the first grid voltage terminal and the third node; and
    a second grid voltage terminal coupled to the fourth node.

6. The totem pole PFC converter of claim 1 further comprising a filter capacitor coupled between the first node and the third node.

7. The totem pole PFC converter of claim 1 further comprising a first load terminal coupled to first node and a second load terminal coupled to the third node.

8. The totem pole PFC converter of claim 1 wherein the first rectifier and the second rectifier are both rectifier diodes.

9. The totem pole PFC converter of claim 1 wherein the first transistor and the second transistor are both field-effect transistors (FETs).

10. The totem pole PFC converter of claim 7 wherein the totem pole PFC converter achieves between 98% and 99% efficiency under a 2000 W load coupled between the first load terminal and the second load terminal.

11. A PFC converter system comprising:
    a totem pole PFC converter configured to convey power with power factor correction from a voltage source to a load by alternately switching current through a first current path and a second current path driven by the voltage source and to generate a current sense voltage that is proportional to the current, wherein the totem pole PFC converter comprises a first current sense resistor located in the first current path to generate the current sense voltage during a first half cycle of the voltage source and a second current sense resistor located in the second current path to generate the current sense voltage during a second half cycle of the voltage source such that the current sense voltage does not cross zero; and
    an analog controller configured to provide at least one switching signal to the totem pole PFC converter in response to the current sense voltage.

12. The PFC converter system of claim 11 wherein the totem pole PFC converter comprises:
    a first transistor having a first current terminal coupled to a first node, a first control terminal, and a second current terminal;

a second transistor having a third current terminal coupled to the second current terminal at a second node, a second control terminal, and a fourth current terminal coupled to a third node a first rectifier coupled to the first node with the first current sense resistor coupled between the first rectifier and a fourth node;

a second rectifier coupled to the third node with the second current sense resistor coupled between the second rectifier and the fourth node;

a current sense output terminal coupled between the first rectifier and the first current sense resistor; and a current sense ground terminal coupled between the second current sense resistor and the second rectifier.

13. The PFC converter system of claim 12 wherein during operation the current sense voltage is a negative voltage generated between the current sense output terminal and the current sense ground terminal.

14. The PFC converter system of claim 12 further comprising:
   a first grid voltage terminal;
   a filter inductor coupled between the first grid voltage terminal and the second node; and
   a second grid voltage terminal coupled to the fourth node.

15. The PFC converter system of claim 12 further comprising a filter capacitor coupled between the first node and the third node.

16. The PFC converter system of claim 12 further comprising a first load terminal coupled to the first node and a second load terminal coupled to the third node.

17. The PFC converter system of claim 16 wherein the totem pole PFC converter achieves between 98% and 99% efficiency under a 2000 W load coupled between the first load terminal and the second load terminal.

18. The PFC converter system of claim 12 wherein the first rectifier and the second rectifier are both diodes.

19. The PFC converter system of claim 12 wherein the first transistor and the second transistor are both FETs.

20. The PFC converter system of claim 12 wherein the analog controller comprises:
   a first control output terminal coupled to the first control terminal;
   a second control output terminal coupled to the second control terminal;
   a current sense input terminal coupled to the current sense output terminal;
   a signal ground coupled to the current sense ground terminal; and
   a pulse width modulator (PWM) generator configured to provide a first switching signal through the first control output terminal and provide a second switching signal through the second control output terminal in response to the current sense voltage generated between the current sense output terminal and the current sense ground terminal.

21. The PFC converter system of claim 20 further including a feedback voltage generator comprising:
   an amplifier having a first amplifier input terminal coupled to the second node, a second amplifier input terminal, and a feedback output terminal;
   a first voltage sense resistor coupled between the first node and the first amplifier input terminal; and
   a second voltage sense resistor coupled between the first amplifier input terminal and the second node.

22. The PFC converter system of claim 21 wherein the analog controller further comprises:
   a first summing node having a first summing input terminal coupled to the feedback output terminal, a second summing input terminal coupled to a reference voltage and a first summing output terminal for providing an error voltage that is a summation of a feedback voltage generated by the feedback voltage generator and the reference voltage;
   an error amplifier having an error voltage input terminal coupled to the first summing output terminal and an amplified error voltage output terminal for providing an amplified error voltage; and
   a second summing node having a third summing input terminal coupled to the amplified error voltage output terminal to receive the amplified error voltage and a fourth summing input terminal coupled to the current sense output terminal to receive the current sense voltage, and a second summing output terminal coupled to an input of the PWM generator that is configured to receive a resultant voltage provided at the second summing output terminal of the second summing node.

* * * * *